United States Patent [19]
Koudelka et al.

[11] Patent Number: 6,088,054
[45] Date of Patent: Jul. 11, 2000

[54] FILM SCANNING APPARATUS

[75] Inventors: James R. Koudelka, Williamson; Andrea S. Rivers, Bloomfield; Joel D. DeCaro, Brockport; Jeffery R. Hawver, Rochester, all of N.Y.

[73] Assignee: Eastman Kodak Company, Rochester, N.Y.

[21] Appl. No.: 09/003,385

[22] Filed: Jan. 6, 1998

[51] Int. Cl.7 .................................................. H04N 7/18
[52] U.S. Cl. .............................................................. 348/96
[58] Field of Search ................................ 348/96, 97, 98, 348/99, 100, 101, 102, 103, 105, 106, 107

[56] References Cited

U.S. PATENT DOCUMENTS

| | | | |
|---|---|---|---|
| 4,823,204 | 4/1989 | Holland | 358/347 |
| 4,875,102 | 10/1989 | Poetsch | 358/214 |
| 4,903,131 | 2/1990 | Lingemann et al. | 358/214 |
| 5,012,345 | 4/1991 | Elworthy | 358/214 |
| 5,107,127 | 4/1992 | Stevens | 250/548 |
| 5,194,958 | 3/1993 | Pearman et al. | 358/214 |
| 5,266,979 | 11/1993 | Brown et al. | 352/224 |
| 5,402,166 | 3/1995 | Mead et al. | 348/96 |
| 5,453,653 | 9/1995 | Zumeris | 310/323 |
| 5,493,330 | 2/1996 | Tomura et al. | 348/102 |
| 5,565,912 | 10/1996 | Easterly | 348/96 |
| 5,600,450 | 2/1997 | Kaye | 348/99 |
| 5,616,980 | 4/1997 | Zumeris | 310/323 |
| 5,631,696 | 5/1997 | Tanaka et al. | 348/96 |
| 5,808,669 | 9/1998 | Schmutz | 348/97 |

*Primary Examiner*—Bryan Tung
*Attorney, Agent, or Firm*—David M. Woods

[57] ABSTRACT

A film scanner is disclosed including an image sensor moveable to a scan position for scanning image frames of an elongated film having a series of edge perforations including a reference perforation for each image frame. The film scanner further includes an intermittent film transport mechanism for moving an image frame to a scanning position, and a sensor transport assembly mounted relative to the intermittent film transport mechanism and moveable in hop and weave directions. The sensor transport assembly includes a structure for mounting the image sensor for movement in the hop and weave directions, a detector mounted relative to the image sensor for detecting the reference perforation and for producing hop and weave signals, and circuitry responsive to the hop and weave signals to move the sensor transport assembly in the hop and weave directions to align the detector over the reference perforation, so that the image sensor is aligned with the image frame so that the image frame can be scanned.

16 Claims, 4 Drawing Sheets

FILM SCANNING APPARATUS

FIELD OF THE INVENTION

The present invention relates generally to the field of film scanners, and in particular, to film scanning apparatus for scanning motion picture film.

BACKGROUND OF THE INVENTION

Systems for converting cinematographic (i.e., motion picture) images into digital signals typically include a film transport which moves film from a supply reel to a take up reel. Between the reels, the film passes through a scan gate or shuttle where the image is captured by an image sensor, which is typically a charge coupled device ("CCD") sensor. Such systems are known in the motion picture industry as CCD based telecines or scanners. In these systems, it is important that each scanned frame be positioned in the same location for scanning as its neighboring frames. If this is not possible, the position of each frame during scanning must be known so that any position variation can be corrected in the digital signal, such as by digital image manipulation techniques. In either event, the digital signal corresponds to a "steady" image sequence. Various special effects can then be applied to the digital signals representing such steady image sequences.

To achieve steadiness, film scanners have traditionally used mechanical registration devices in an attempt to duplicate the manner in which a motion picture camera which exposed the film has pin registered each image frame. Such mechanical registration devices range from the most basic film edge guides, through the use of sprocket wheels, to full pin registration systems. Film edge guides attempt to provide control over lateral motion of the film, but edge guides do a poor job of duplicating the registration provided by a pin registered camera. Pin registration systems attempt to duplicate the pin registration system of the exposing camera, in which the pins fully engage through perforation holes in the film. However, sprocket wheels using pins which partially fit a film perforation, reference only one edge of the perforation, while the typical tolerance on the dimension between the center of a film perforation and the film edge varies by +/−50 micrometers. Additionally, the standard specification for the variation of the width of a film perforation is +/−10 micrometers. Thus, such partially fitting pins leave room for mis-positioning of a perforation, and hence, an associated film frame during scanning. While these numbers may seem small, it must be remembered that following image processing, such as for special effects, the scanned motion picture images will be re-printed on a motion picture film. This re-printed film (or copies of it) will be substantially magnified for projection onto the screen of a theater and the resulting film will be magnified for projection. Mis-positioning between successive frames during scanning thereby results in a highly visible and undesirable movement of an image or portion of a composite image on a screen.

Attempts have been described in U.S. Pat. No. 5,266,979 to combine edge guidance and full fitting pins with a sprocket wheel arrangement. However, this system over constrains the film as it passes through a film gate for scanning, which can result in film flatness or image distortion problems. Further, in any sprocket wheel arrangement, since the same pins do not contact each frame, a large emphasis is placed upon the quality of manufacturing processes for sprocket wheels.

Pure pin registration systems utilize both a full fitting big pin to engage perforations along one side of the film, and a partial fitting little pin to engage perforations along the other edge of the film, to exactly constrain the film in the x and y directions, and to prevent rotation of the film. The same pins are used to register each frame. When properly designed and maintained, these systems provide the best duplication of camera pin registration. However, there are disadvantages to the use of mechanical pin registration. In general, such systems are intermittent motion systems with lower throughput. Further, the design, construction, and maintenance of the registration mechanism and the pins are expensive. In addition, the complexity and cost of the subsystems surrounding a pin registered film scanning gate is relatively high. Furthermore, the risk of perforation damage is a constant concern. This is particularly true since film age and means of storage will effect the dimensions and elasticity of the film. Thus, the risk of damage to archived films increases in a pin registered system. As a result, pin registered systems are not used in high throughput motion picture film scanning systems.

Non-contact perforation detection systems avoid the risk of film damage, and can run at high speed. In addition, non-contact perforation detection systems are inexpensive and can be easily maintained. Several non-contact perforation detection systems have been described, for example, in commonly-assigned U.S. Pat. No. 5,107,127, the disclosure of which is herein incorporated by reference. However, previous non-contact perforation detection systems do not appreciate any problems associated with dimensional variations of a film being scanned. Furthermore, such systems typically transport the film in a continuous fashion and detect the perforation at a location remote to the scanning position. Because it is difficult to accurately control film motion without any slip or film dimensional variations, such systems result in less than optimal steadiness.

SUMMARY OF THE INVENTION

Accordingly, it is an object of the present invention to provide a film scanner for a motion picture film which accurately aligns an image sensor over a film frame to be scanned to substantially minimize errors resulting from film dimensional variations of the film.

It is another object of the present invention to provide a film scanner for a motion picture film which eliminates film transport variations and substantially improves overall image steadiness.

These objects are achieved by a film scanner including an image sensor moveable to a scan position for scanning image frames of an elongated film having a series of edge perforations including a reference perforation for each image frame, comprising:

(a) an intermittent film transport mechanism for moving an image frame to a scanning position; and
(b) a sensor transport assembly mounted relative to the intermittent film transport mechanism and moveable in hop and weave directions, and including:
  (i) means for mounting the image sensor for movement in the hop and weave directions;
  (ii) detection means mounted relative to the image sensor for detecting the reference perforation and for producing hop and weave signals; and
  (iii) means responsive to the hop and weave signals to move the sensor transport assembly in the hop and weave directions to align the detection means over the reference perforation, so that the image sensor is aligned with the image frame so that the image frame can be scanned.

ADVANTAGES

An advantage of the present invention is to provide film scanning apparatus which accurately determines the position of a film frame for scanning with minimal error resulting from film dimensional variations of the film. Another advantage of the present invention is to provide film scanning apparatus which improves overall image steadiness. As a result, a motion picture film which has been scanned using such film scanning apparatus, re-printed, and projected onto a screen does not exhibit significant motion due to scanning errors when projected.

DETAILED DESCRIPTION OF THE INVENTION

Figure 1:
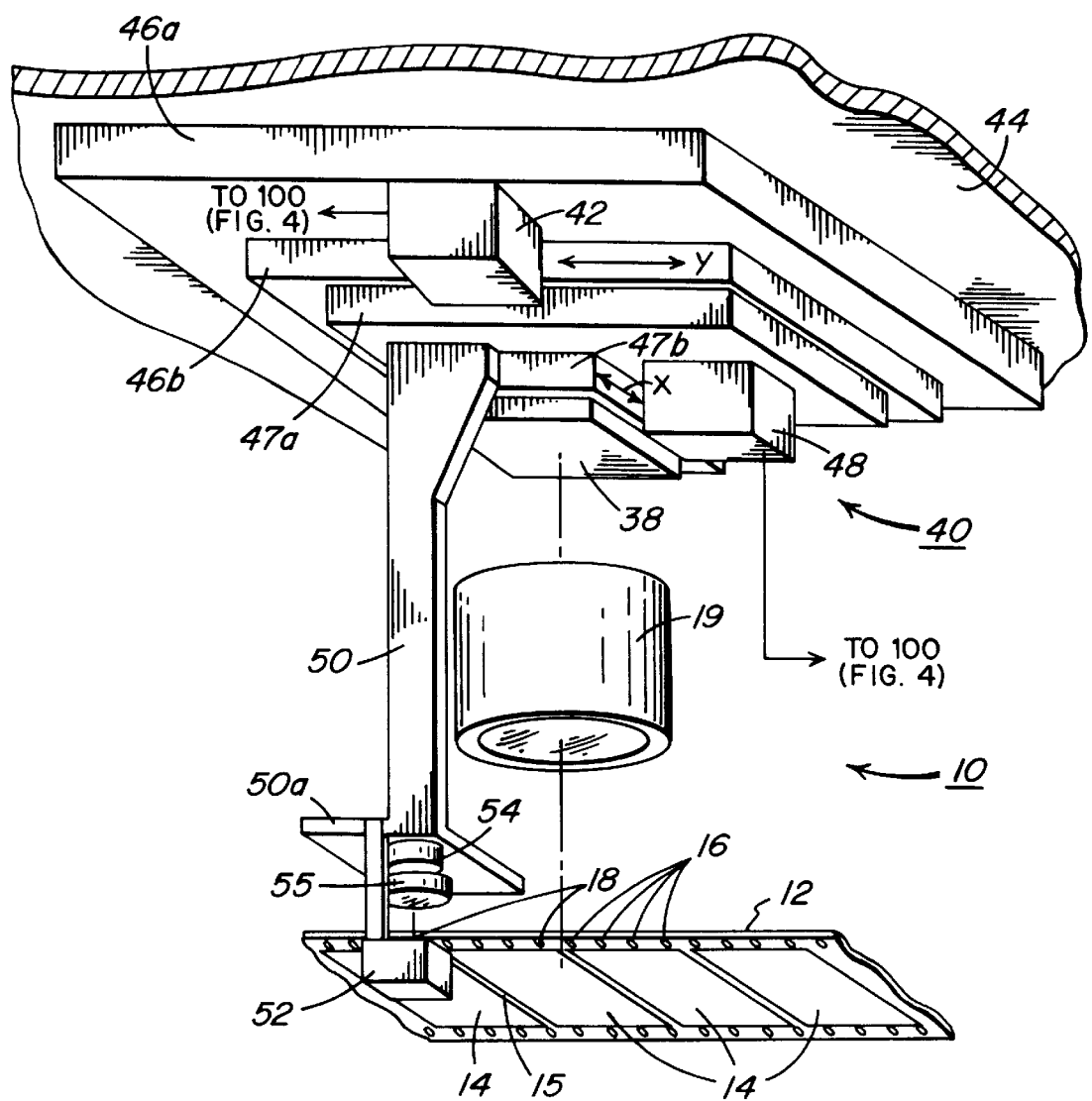
FIG. 1 is a perspective view of a film scanner in accordance with the present invention.
Figure 2:
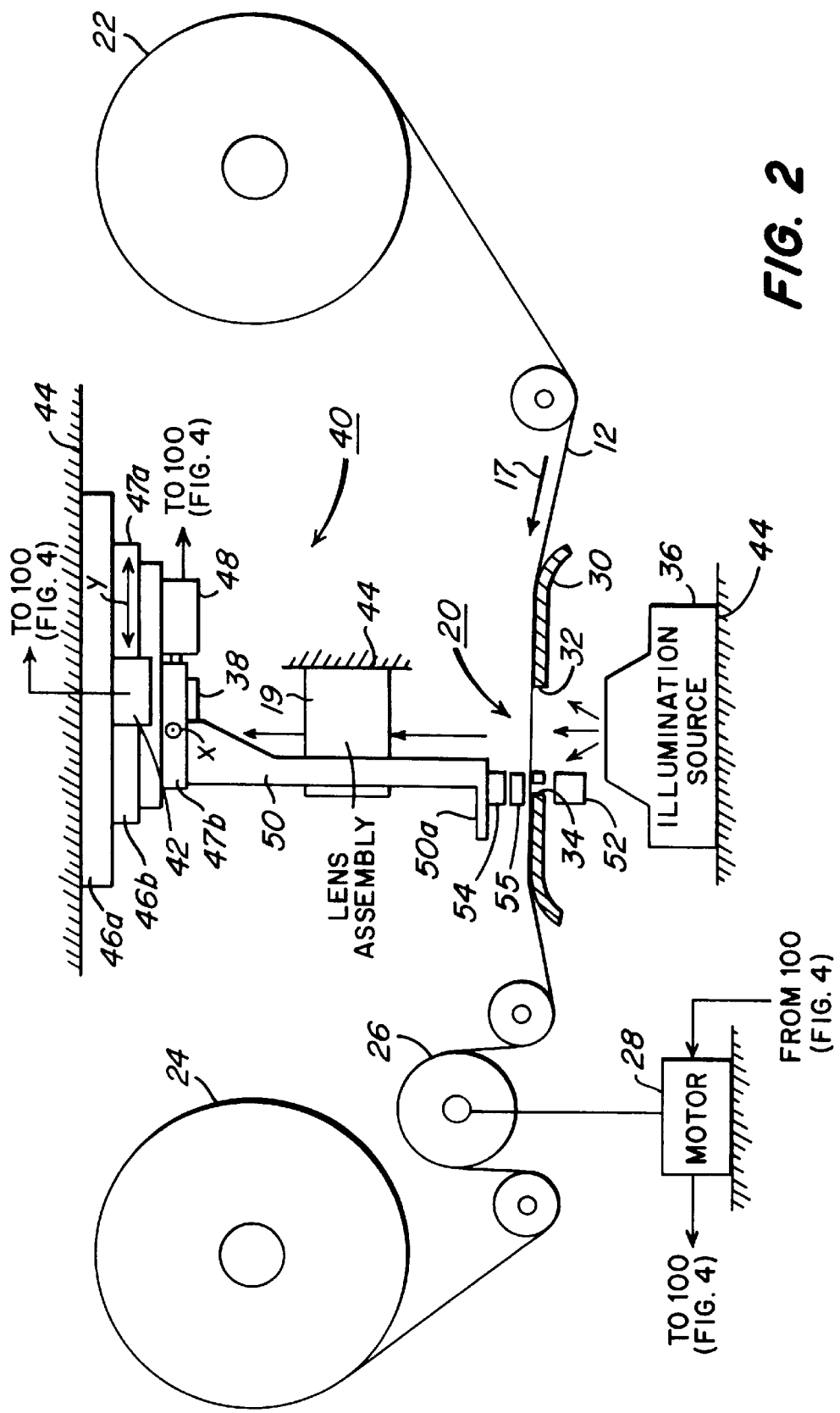
FIG. 2 is a schematic side view of the film scanner of FIG. 1.

Referring to FIGS. 1 and 2, a film scanner 10 for scanning image frames of an elongated film, such as a motion picture film, in accordance with the present invention is shown. FIG. 1 is a perspective view of the film scanner 10 and FIG. 2 is a side view of the film scanner 10. It will be understood that a motion picture film is typically considered to be a continuous film web (or a portion thereof) of at least 10 meters (or even greater than 100 meters), with portions of that length typically not having been spliced, and with the film having been obtained from a single camera. As shown in FIG. 1, the elongated film 12 includes image frames 14 to be scanned. Each image frame 14 includes a series of edge perforations 16 along at least one edge of the film 12. The edge perforations 16 are used in a motion picture camera (not shown) to move the film 12 and to align the film 12 to a set of registration pins in the camera for each exposure. Thus, the edge perforations 16 are a reference to which the image is placed on the film 12 by the camera. Often in motion picture film, every fourth edge perforation 16 is a reference perforation 18. Each reference perforation 18 is associated with a corresponding image top of frame 15 since during exposure of the film 12, that is the perforation which is normally engaged by the camera perforation pin when the corresponding frame is being exposed. Thus, by locating the reference perforation 18, it is possible to locate the image frame 14 to be scanned.

As shown in FIG. 2, the film scanner 10 includes an intermittent film transport mechanism for moving the film 12 in increments of approximately one image frame to a scanning position 20 and for holding the film 12 stationary during scanning. The intermittent film transport mechanism includes a supply reel 22 and a take-up reel 24, which are driven by a capstan drive 26 including a motor 28 in a manner well known in the art. The motor 28 is under the control of a microcomputer 100 shown in FIG. 4. The supply reel 22, take-up reel 24, and capstan drive 26 keep the film 12 under tension as the film 12 is advanced in the film travel direction 17. Typically, the capstan drive 26 includes an encoder (not shown) for providing information to the microcomputer 100 for controlling the position of the capstan drive 26 in a manner well known in the art. An edge-guided skid plate 30 having a first opening 32 and a second opening 34 is located at the scanning position 20 to keep the film 12 flat during scanning.

An illumination source 36 is positioned to transmit light uniformly through the first opening 32 of the skid plate 30, and therefore, through the image frame 14 located in the scanning position 20. An image sensor 38 is mounted on a sensor transport assembly 40 for scanning the image frame 14. A lens assembly 19 is mounted separate from the sensor transport assembly 40 to a stationary scanner housing 44. The lens assembly 19 projects an image of the image frame 14 (shown in FIG. 1) at the first opening 32 onto the image sensor 38. In a first embodiment, the image sensor 38 is an area image sensor. Alternatively, the image sensor 38 can be a linear image sensor. The illumination source 36 and the image sensor 38 are well known in the art of film scanning.

The sensor transport assembly 40 as depicted in FIGS. 1 and 2 includes a first linear translation stage 46 and a second linear translation stage 47. The first linear translation stage 46 includes a fixed base 46a, and a movable stage 46b which is constrained to move in only one direction by either a bearing or flexure system (not shown). The fixed base 46a is securely mounted to the stationary scanner housing 44. The orientation of the mounting of the linear translation stage 46 is such that the movable stage 46b is movable in the y-direction (hop direction) along the length of the film 12. Likewise, the second linear translation stage 47 comprises a fixed base 47a and a moveable stage 46b. As shown in FIGS. 1 and 2, the fixed base 47a is fixedly mounted to the moveable stage 46b of the first linear translation stage 46. The movable stage 47b is constrained to move in only one direction by either a bearing or flexure system (not shown). The orientation of the mounting of the linear translation stage 47 is such that the movable stage 47b is movable in the x-direction (weave direction) transverse to the motion of the film 12. The image sensor 38 is securely mounted to the movable stage 46b. Thus, this arrangement of the first linear translation stage 46 and the second linear translation stage 47 provides for simultaneous motion of the movable stage 47b and the image sensor 38 in both the hop and weave directions relative to the image frame 14.

A first micromotor 42 is fixedly attached to the fixed base 46a of the first linear translation stage 46. The first micromotor 42 provides the driving force to move the movable stage 46b relative to fixed base 46a in the hop direction. Likewise, a second micromotor 48 is fixedly attached to the fixed base 47a of the second linear translation stage 47. The second micromotor 48 provides the driving force to move the movable stage 47b relative to the fixed base 47a in the weave direction. Appropriate structures are provided for permitting x-y movement of the sensor transport assembly 40. Preferably, the first micromotor 42 and the second micromotor 48 are piezo-electric ceramic motors which move in nanometer increments. Such micromotors are described in more detail in U.S. Pat. No. 5,453,653 and U.S. Pat. No. 5,616,980, the disclosures of which are herein incorporated by reference.

The sensor transport assembly 40 further includes an upright portion 50 which is securely fastened to the movable stage 47b of the second linear translation stage 47. Thus, the upright portion 50 moves in the hop and weave directions in the exact same fashion as the image sensor 38 which is also mounted to the movable stage 46b.

The sensor transport assembly 40 further includes detection means mounted relative to the image sensor 38 on a member 50a of the upright portion 50 so that the detection means is moveable in the hop and weave directions. The detection means includes a light source 52 which is mounted on the upright portion 50 of the sensor transport assembly 40 so that the light is transmitted through the second opening 34 of the skid plate 30 (shown in FIG. 2). The light source 52 can be, for example, a tungsten lamp coupled with a 450 nanometer bandpass filter. The detection means further includes a perforation detector 54 which detects an image of the reference perforation 18 of the image frame 14 to be scanned. The perforation detector 54 is mounted on the member 50a of the upright portion 50 of the sensor transport assembly 40 with a known separation distance from the image sensor 38. Conventional optics 55 focuses the image of the reference perforation 18 on the perforation detector 54. In accordance with the present invention, the magnification ratio of the optics 55 is substantially the same as the magnification ratio of the lens assembly 19. Alternatively, the lens assembly 19 could be used to focus the image of the reference perforation 18 on the perforation detector 54. With such a configuration, it will be understood by those skilled in the art that the perforation detector 54 would be mounted adjacent to the image sensor 38 on the moveable stage 47b.

Figure 3A:
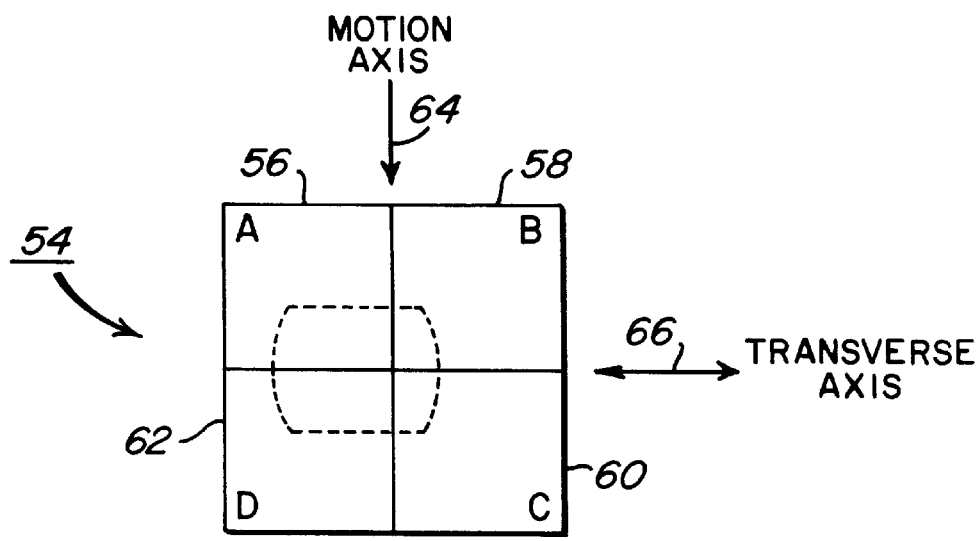
FIG. 3A is a view of the reference perforation image on the perforation detector of FIG. 1.
Figure 3B:
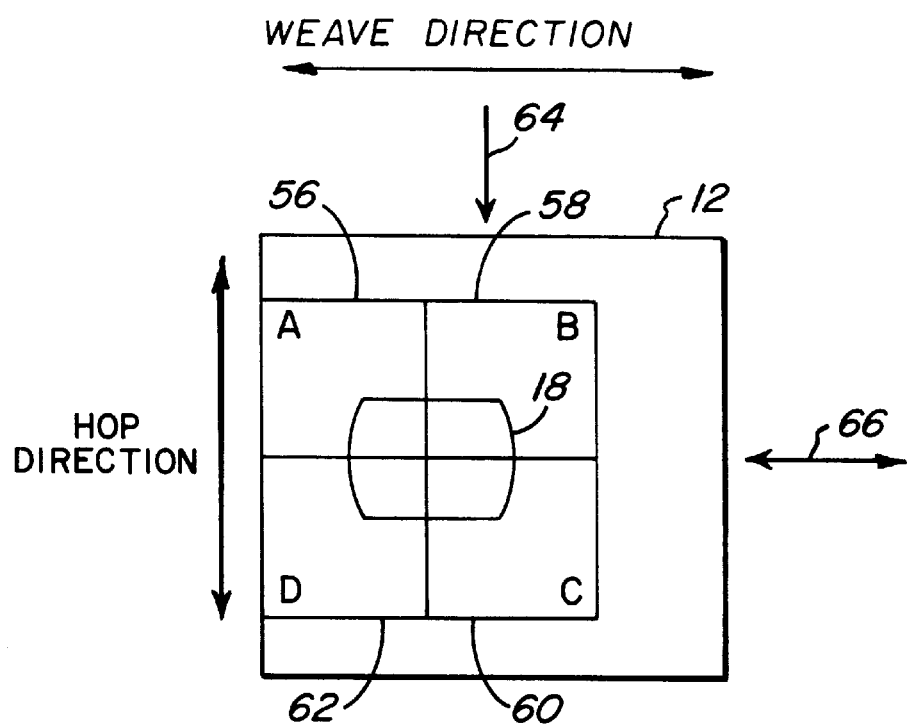
FIG. 3B is a view which illustrates the perforation detector of FIG. 3A in relation to the reference perforation.

Turning to FIGS. 3A and 3B, the perforation detector 54 in accordance with the present invention is shown in more detail. As shown in FIG. 3A, the perforation detector 54 is preferably a quadrant detector. The quadrant perforation detector 54 is a conventional light sensitive device containing four regions of light sensitivity or light sensing elements 56, 58, 60, and 62. The quadrant perforation detector 54 is arranged orthogonally with elements 56, 58, 60, and 62 on both sides of a motion axis 64 and a transverse axis 66. The motion axis 64 is parallel to the film travel direction 17 and the hop direction. The transverse axis 66 is perpendicular to the motion axis 64 and parallel to the weave direction. The elements 56, 58, 60, and 62 should be positioned as closely as possible to their neighbors across the dividing axis so that the gap at the axis is as small as possible. The elements 56, 58, 60, and 62 can be round or some other shape, however, rectangular or square shaped elements are preferable. Each region or light sensitive element 56, 58, 60, and 62 of the quadrant perforation detector 54 preferably is designed with uniform sensitivity.

As previously discussed, the perforation detector 54 is fixed to the sensor transport assembly 40 with a known separation distance relative to the image sensor 38. This is shown in FIGS. 1 and 2. In accordance with the present invention, when the intermittent film transport mechanism advances the film 12 so that the image frame 14 to be scanned is in the scanning position 20, the reference perforation 18 of the image frame 14 to be scanned is positioned over the second opening 34 of the skid plate 30. The light source 52 transmits light through the reference perforation 18 in the film 12 so that an image of the reference perforation 18 is sensed by the quadrant perforation detector 54.

Elements 56, 58, 60, and 62 of the quadrant perforation detector 54 each produce an analog signal in response to the detected image of the reference perforation 18. These four analog signals are used to produce a Hop signal 72 and a Weave signal 74 which indicate the location of the quadrant perforation detector 54 relative to the reference perforation 18. The Hop signal 72 provides perforation location information along the length of the film 12, and is defined as the normalized difference between the sum of the signals produced by elements 56 and 58, and the sum of the signals produced by elements 60 and 62. The Weave signal 74 is proportional to the amount of light falling on one of the sides of the motion axis 64, and therefore, provides location information across the film 12 or transverse to the length of the film 12. The Weave signal 74 is defined as the normalized difference between the sum of the signals produced by elements 56 and 62, and the sum of the signals produced by elements 58 and 60. The Hop signal 72 and the Weave signal 74 are set forth in equations (1) and (2), respectively, as follows:

$$H = \frac{(A-C)+(B-D)}{A+B+C+D} \quad (1)$$

$$W = \frac{(A-C)-(B-D)}{A+B+C+D} \quad (2)$$

wherein H is the Hop signal 72, W is the Weave signal 74, and A, B, C, and D are the outputs of the corresponding elements 56, 58, 60, and 62, respectively, as illustrated in FIGS. 3A and 3B.

In accordance with the present invention, the sensor transport assembly 40 first moves the quadrant perforation detector 54 in the hop direction using the first micromotor 42 until the quadrant perforation detector 54 is centered over the reference perforation 18 in the hop direction. The quadrant perforation detector 54 is centered over the reference perforation 18 in the hop direction when the Hop signal 72 is substantially equal to zero. The quadrant perforation detector 54 is then moved in the weave direction until the Weave signal 74 is substantially equal to zero, thereby indicating that the quadrant perforation detector 54 is centered over the reference perforation 18 in the weave direction. Thus, the Hop signal 72 and the Weave signal 74 are being servoed to a null condition.

As previously mentioned and as shown in FIGS. 1 and 2, the perforation detector 54 is fixed to the sensor transport assembly 40 with a known separation distance from the image sensor 38. Thus, by positioning the perforation detector 54 at the center of the reference perforation 18 in both the hop and weave directions, the image sensor 38 is effectively centered over the image frame 14 to be scanned at the scanning position 20. Scanning of the image frame 14 can now be performed by the image sensor 38 in a manner which would be understood by those skilled in the art. It should be noted that when the image sensor 38 is a linear image sensor, the image sensor 38 must be positioned relative to the perforation detector 54 so that when the perforation detector 54 is at the center of the reference perforation 18 in the hop and weave directions, the active region of the linear image sensor 38 is positioned at the image top of frame 15 of the image frame 14 to be scanned. Further, it will be understood by those skilled in the art that when the image sensor 38 is a linear image sensor, the first micromotor 42 would additionally control the movement of the linear image sensor 38 in the hop direction so that the entire image frame 14 can be scanned line-by-line. Once scanning is complete, the intermittent film transport mechanism moves the film 12 to the next image frame 14 to be scanned. Note, however, that with a linear image sensor, the image sensor 38 must be returned to its starting position prior to scanning the next image frame 14.

Figure 4:
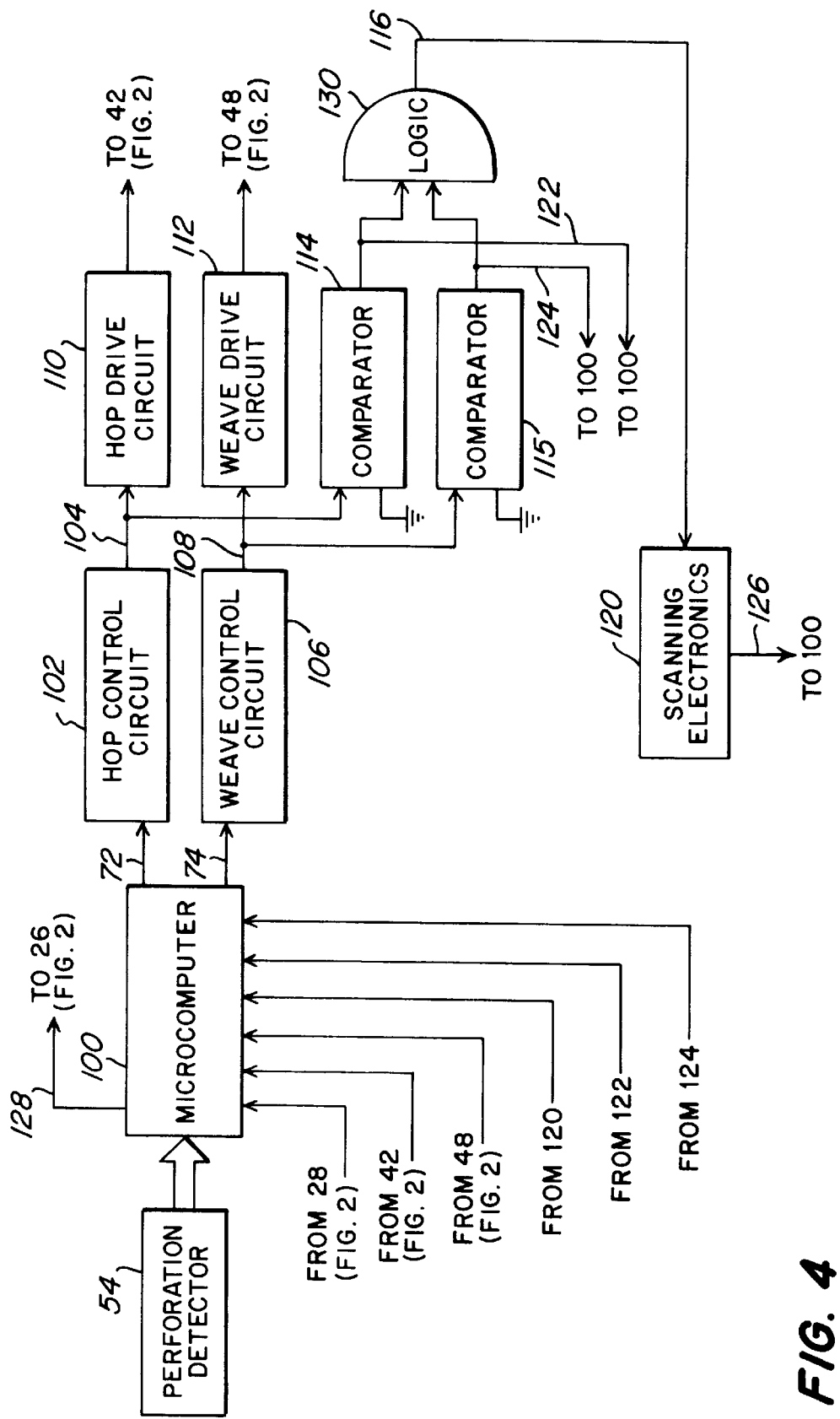
FIG. 4 is a block diagram of the circuitry for driving the sensor transport assembly of the film scanner of FIG. 1 in the hop and weave directions.

FIG. 4 is a block diagram of the circuitry which drives the first micromotor 42 (shown in FIGS. 1 and 2) and the second micromotor 48 (shown in FIGS. 1 and 2) in response to the signals produced by elements 56, 58, 60, and 62 of the quadrant perforation detector 54. The four analog signals produced by elements 56, 58, 60, and 62 of the quadrant perforation detector 54, respectively, are applied to the microcomputer 100. The microcomputer 100 performs other functions, but in this case, the microcomputer 100 digitizes the four analog signals, and produces the Hop signal 72 and the Weave signal 74 as previously discussed and in accordance with equations (1) and (2). The Hop signal 72 and the Weave signal 74 are used as feedback signals to control the first micromotor 42 and the second micromotor 48. The Hop signal 72 is applied to Hop control circuitry 102, which produces a Hop control signal 104. The Hop control signal 104 is applied to Hop drive circuitry 110, which drives the first micromotor 42. The quadrant perforation detector 54 periodically feeds back a signal to the microcomputer 100 updating the current position of the quadrant perforation detector 54 relative to the reference perforation 18 in the hop direction. The Weave signal 74 is applied to Weave control circuitry 106, which produces a Weave control signal 108. The Weave control signal 108 is applied to Weave drive circuitry 112, which drives the second micromotor 48. The quadrant perforation detector 54 periodically feeds back a signal to the microcomputer 100 updating the current position of the quadrant perforation detector 54 relative to the reference perforation 18 in the weave direction. Throughout this process, a comparator 114 monitors the value of the Hop control signal 104, and when the Hop control signal 104 reaches a range including zero, the comparator 114 feeds a resultant signal 122 back to the microcomputer 100. Likewise, a comparator 115 monitors the value of the Weave control signal 108, and when the Weave control signal 108 reaches a range including zero, the comparator 115 sends a resultant signal 124 back to the microcomputer 100. When the Hop control signal 104 and the Weave control signal 108 are both substantially equal to zero, a logic gate 130 provides a start scan signal 116 to scanning electronics 120 so that the image frame 14 can be scanned in a manner well known in the art. Once scanning of the image frame 14 is complete, the scanning electronics 120 sends a scan complete signal 126 to the microcomputer 100. The microcomputer 100 then sends a ready signal 128 to the intermittent transport assembly indicating that the capstan drive 26 (shown in FIG. 2) should advance the film 12 so that the next image frame 14 to be scanned is in the scanning position 20. It will be understood that the circuitry set forth in FIG. 4 is representative, and that various circuits that could be used in accordance with the present invention would suggest themselves to those skilled in the art.

Although the present invention has been described with reference to micromotors for movement of the perforation detector 54 and the image sensor 38, it should be noted that movement of the perforation detector 54 and the image sensor 38 in the hop and weave directions can be implemented using other transport mechanisms, such as a piezoelectric stack or inchworm drive, a voice coil motor, or any other prime mover. However, the use of micromotors as disclosed in U.S. Pat. No. 5,616,980 is preferred because of cost, as well as the capability of both high speed and small incremental precision motion. Further, it will be understood by those skilled in the art that alignment of the image sensor 38 with the image frame 14 to be scanned in accordance with the present invention could be accomplished by movement of the image frame 14 in the hop and weave directions rather than by movement of the image sensor 38. Appropriate structures for such movement of the image frame 14 would suggest themselves to those skilled in the art.

The use of the above described film scanner with the sensor transport assembly 40 substantially reduces errors in the determined position of an image frame 14 resulting from film dimensional variations along its length. The pin-free image registration system is lower cost than a pure pin registered system, or a full fitting sprocket system. In addition, the pin-free image registration system is easier to load with film than either of the pin registered options.

The invention has been described in detail with particular reference to certain preferred embodiments thereof, but it will be understood that variations and modifications can be effected within the spirit and scope of the invention.

| PARTS LIST | |
|---|---|
| 10 | film scanner |
| 12 | film |
| 14 | image frame |
| 15 | image top of frame |
| 16 | edge perforation |
| 17 | film travel direction |
| 18 | reference perforation |
| 19 | lens assembly |
| 20 | scanning position |
| 22 | supply reel |
| 24 | take-up reel |
| 26 | capstan drive |
| 28 | motor |
| 30 | skid plate |
| 32 | first opening |
| 34 | second opening |
| 36 | illumination source |
| 38 | image sensor |
| 40 | sensor transport assembly |
| 42 | first micromotor |
| 44 | scanner housing |
| 46 | first linear translation stage |
| 46a | fixed base |
| 46b | movable stage |
| 47 | second linear translation stage |
| 47a | fixed base |
| 47b | movable stage |
| 48 | second micromotor |
| 50 | upright portion |
| 50a | member |
| 52 | light source |
| 54 | perforation detector |
| 55 | optics |
| 56 | light sensing element |
| 58 | light sensing element |
| 60 | light sensing element |
| 62 | light sensing element |
| 64 | motion axis |
| 66 | transverse axis |
| 72 | Hop signal |
| 74 | Weave signal |
| 100 | microcomputer |
| 102 | Hop control circuitry |
| 104 | Hop control signal |
| 106 | Weave control circuitry |
| 108 | Weave control signal |
| 110 | Hop drive circuitry |
| 112 | Weave drive circuitry |
| 114 | comparator |
| 115 | comparator |
| 116 | start scan signal |
| 120 | scanning electronics |
| 122 | resultant signal |
| 124 | resultant signal |
| 126 | scan complete signal |
| 128 | ready signal |
| 130 | logic gate |

What is claimed is:

1. A film scanner including an image sensor moveable to a scan position for scanning image frames of an elongated film having a series of edge perforations including a reference perforation for each image frame, comprising:

(a) an intermittent film transport mechanism for moving an image frame to a scanning position; and (b) a sensor transport assembly mounted relative to the intermittent film transport mechanism and moveable in hop and weave directions, and including:

(i) means for mounting the image sensor for movement in the hop and weave directions;
(ii) detection means mounted relative to the image sensor for detecting the reference perforation and for producing hop and weave signals; and
(iii) means responsive to the hop and weave signals to move the sensor transport assembly in the hop and weave directions to align the detection means over the reference perforation, so that the image sensor is aligned with the image frame so that the image frame can be scanned.

2. The film scanner of claim 1 further including a skid plate located at the scan position for holding the film flat during scanning.

3. The film scanner of claim 1 wherein the image sensor is an area image sensor.

4. The film scanner of claim 1 wherein the image sensor is a linear image sensor.

5. The film scanner of claim 1 wherein the detection means includes a source of radiation for illuminating the reference perforation, and means responsive to the radiation transmitted through the reference perforation to produce the hop and weave signals.

6. The film scanner of claim 1 wherein the means for mounting the image sensor for movement in the hop and weave directions comprises a first movable stage for moving the image sensor in the hop direction and a second movable stage attached to the first movable stage for moving the image sensor transverse to the first movable stage in the weave direction.

7. The film scanner of claim 6 wherein the image sensor is mounted to the second movable stage.

8. The film scanner of claim 6 wherein the detection means depends from the second movable stage.

9. A film scanner including an image sensor moveable to a scan position for scanning image frames of an elongated film having a series of edge perforations including a reference perforation for each image frame, comprising:

(a) an intermittent film transport mechanism for moving an image frame to a scanning position; and
(b) a sensor transport assembly mounted relative to the intermittent film transport mechanism and moveable in hop and weave directions, and including:
(i) means for mounting the image sensor for movement in the hop and weave directions;
(ii) a detector having at least four elements mounted relative to the image sensor for detecting the reference perforation and for producing hop and weave signals in accordance with the following relationships:

$$H = \frac{(A-C)+(B-D)}{A+B+C+D}$$

$$W = \frac{(A-C)-(B-D)}{A+B+C+D}$$

wherein A, B, C, and D are the outputs of the elements, respectively, H is the hop signal, and W is the weave signal; and (iii) means responsive to the hop and weave signals to move the sensor transport assembly in the hop and weave directions to align the detection means over the reference perforation, so that the image sensor is aligned with the image frame so that the image frame can be scanned.

10. The film scanner of claim 9 further including a skid plate located at the scan position for holding the film flat during scanning.

11. The film scanner of claim 9 wherein the image sensor is an area image sensor.

12. The film scanner of claim 9 wherein the image sensor is a linear image sensor.

13. The film scanner of claim 9 wherein the detection means includes a source of radiation for illuminating the reference perforation, and means responsive to the radiation transmitted through the reference perforation to produce the hop and weave signals.

14. The film scanner of claim 9 wherein the means for mounting the image sensor for movement in the hop and weave directions comprises a first movable stage for moving the image sensor in the hop direction and a second movable stage attached to the first movable stage for moving the image sensor transverse to the first movable stage in the weave direction.

15. The film scanner of claim 14 wherein the image sensor is mounted to the second movable stage.

16. The film scanner of claim 14 wherein the detector depends from the second movable stage.

* * * * *